US011320539B2

(12) United States Patent
Tian

(10) Patent No.: US 11,320,539 B2
(45) Date of Patent: May 3, 2022

(54) ELECTRIC WATER SPORTS DEVICE AND MONITORING SYSTEM

(71) Applicant: YUJET INTERNATIONAL CORPORATION LIMITED, Central (HK)

(72) Inventor: Yu Tian, Hong Kong (HK)

(*) Notice: Subject to any disclaimer, the term of this patent is extended or adjusted under 35 U.S.C. 154(b) by 0 days.

(21) Appl. No.: 16/033,046

(22) Filed: Jul. 11, 2018

(65) Prior Publication Data
US 2019/0168850 A1 Jun. 6, 2019

(30) Foreign Application Priority Data

Dec. 6, 2017 (CN) .......................... 201711279889.1

(51) Int. Cl.
G01S 19/19 (2010.01)
G01S 19/42 (2010.01)
B63B 32/10 (2020.01)

(52) U.S. Cl.
CPC ............. *G01S 19/19* (2013.01); *B63B 32/10* (2020.02); *G01S 19/42* (2013.01)

(58) Field of Classification Search
CPC . B63B 35/7933; B63B 35/7943; G01S 19/19; G01S 19/42
See application file for complete search history.

(56) References Cited

U.S. PATENT DOCUMENTS

| 2010/0138098 | A1* | 6/2010 | Takahara | B60L 15/2045 701/31.4 |
| 2014/0134900 | A1* | 5/2014 | Derrah | B63H 11/01 440/6 |
| 2014/0163854 | A1* | 6/2014 | Matsumoto | B60L 53/665 701/123 |
| 2014/0278038 | A1* | 9/2014 | Stankoulov | G01C 21/3469 701/123 |
| 2014/0379253 | A1* | 12/2014 | Ota | G01C 21/3469 701/439 |
| 2016/0316328 | A1* | 10/2016 | Baran | H04W 8/02 |
| 2017/0192341 | A1* | 7/2017 | Casarez | G03B 17/561 |
| 2018/0292215 | A1* | 10/2018 | Akuzawa | H04W 4/026 |

FOREIGN PATENT DOCUMENTS

CN 106970618 A * 7/2017

* cited by examiner

Primary Examiner — Aaron L Troost
(74) Attorney, Agent, or Firm — WPAT Law, P.C.; Anthony King

(57) ABSTRACT

Disclosed are an electric water sports device and a monitoring system. The electric water sports device includes a device body; wherein the device body is provided with a positioning system, a controller and an electric power acquisition module, wherein the controller includes an electronic map, the positioning system is configured to acquire positioning data of the electric water sports device and send the positioning data to the controller, the electric power acquisition module is configured to acquire electric power data of the electric water sports device and send the electric power data to the controller, and the controller is configured to determine the range of an electric fence in the electronic map according to the positioning data and the electric power data.

16 Claims, 4 Drawing Sheets

ELECTRIC WATER SPORTS DEVICE AND MONITORING SYSTEM

CROSS-REFERENCE TO RELATED APPLICATIONS

This application claims foreign priority to China Pat. Application No. 201711279889.1 filed on Dec. 6, 2017, now pending, which is hereby incorporated by reference in their entirety.

TECHNICAL FIELD

The present disclosure relates to the field of water sports device, and in particular, relates to an electric water sports device and a monitoring system.

BACKGROUND

Surfing is a sports item which depends on sea waves and struggles against the sea waves by using high technical skills and good balancing capability of a surfer. In the surfing, the surfer drives over the sea waves by standing on a surfboard, or by using a belly board, a knee board, an inflated rubber pad, a canoe, a kayak or the like.

The surfboard is a sports device used by people in surfing sports. The initially used surfboard has a length of about 5 m and a weight of 50 to 60 kg. After the Second World War, foam plastic boards have come into being, and the shapes of the boards have also been perfected. The conventionally used surfboard has a length of 1.5 to 2.7 m, a width of about 60 cm and a thickness of 7 to 10 cm. The surfboard is light and flat, the front and rear ends of the surfboard are a little bit narrower and smaller, and the rear lower part is provided with a tail fin achieving an effect of stabilization. To increase the friction, generally a wax-like film is coated on the surface of the board. However, the entire weight of the surfboard is only 11 to 26 kg.

With the development of technologies, electric surfboards are developed. The electric surfboard is driven by a lithium battery, and a built-in lithium battery is capable of supplying several hours' power to the electric surfboard. The conventional electric surfboard totally depends on the power supplied by the battery. Therefore, the surfboard may not return back when the power is insufficient or there is no power. If in this case the electric surfboard is far away from the return point, the electric surfboard may only return back by depending on manpower. As a result, safety risks are great. Therefore, inevitably, a user or an operator of the electric surfboard needs to play much time and attention to the power of the battery. Without a prompting function, the surfer dare not to travel with the surfboard to a too far position, and may not reasonably control the surfing range in real time. This, to a great extent, restricts the entertainment margin of the water sports lovers, and fails to accommodate the ever-increasing entertainment demands of the people. Further, monitoring inconvenience is also caused to the operator of the electric surfboard.

SUMMARY

In view of the defects that a user or an operator of an electric surfboard needs to pay much attention to electric power of the battery and thus fails to reasonably control the surfing range in real time, and thus high risks are present in return when the battery has no power; and that the operator of the electric surfboard is inconvenient to monitoring the surfboard in the prior art, the present disclosure is intended to provide an electric water sports device and a monitoring system therefore which are capable of smartly planning a safe travel range in real time according to electric power thereof, and improving safety by preventing a failure to return due to lack of power.

According to the present disclosure, the above technical problem is solved by using the following technical solutions:

The present disclosure provides an electric water sports device. The electric water sports device includes a device body; wherein the device body is provided with a positioning system, a controller and an electric power acquisition module, wherein the controller includes an electronic map, the positioning system is configured to acquire positioning data of the electric water sports device and send the positioning data to the controller, the electric power acquisition module is configured to acquire electric power data of the electric water sports device and send the electric power data to the controller, and the controller is configured to determine the range of an electric fence in the electronic map according to the positioning data and the electric power data.

In this technical solution, by additionally configuring a positioning system on the device body, real-time position of the electric water sports device may be acquired, and the controller includes the electronic map and determines the range of the electronic fence in the electronic map according to the electric power data and the positioning data, such that the electric water sports device is capable of smartly planning a safe travel range thereof according to the real-time power thereof. This prevents a failure to return due to insufficient power, and improves safety of the electric water sports device.

Optionally, the electronic map includes water depth, and the controller is further configured to determine the range of the electric fence in the electronic map according to the positioning data, the water depth and the electric power data.

In this technical solution, the electronic map further includes water depth of each position, and the range of the electronic fence is determined by further reference to the water depth of each position in the electronic map. In this way, the electric water sports device may be prevented from traveling to an over-shadow or over-deep water region. Therefore, after the water depth is increased, the determined range of the electronic fence is more reasonable and safe.

Optionally, the controller is further configured to determine the range of the electric fence in the electronic map according to the positioning data, the electric power data and a predetermined map range.

In this technical solution, by predetermining a safe map range in the electronic map, it may be smartly ensured that the electric water sports device has operated in a safe water region by further reference to the positioning data and the electric power data.

Optionally, the controller is further configured to determine the range of the electric fence in the electronic map according to the positioning data, the electric power data and a remaining operation duration, the remaining operation duration being a difference between a predetermined operation duration and a duration where the electric water sports device has operated.

In this technical solution, the electric water sports device stores the predetermined operation duration, that is, a maximum operation duration that is allowed in a travel. This duration may be defined by using an external device remotely, or may be defined locally by the electric water sports device. The allowed remaining operation duration may be obtained according to the duration where the electric water sports device has operated and the predetermined operation duration. In this technical solution, the remaining operation duration may also be used as a parameter for determining the range of the electronic fence, and hence the electric water sports device may be better managed and controlled.

Optionally, the device body is further provided with an alarm unit, and the control is further configured to judge whether the electric water sports device exceeds the range of the electronic fence, and drive the alarm unit to generate an alarm if the electric water sports device exceeds the range of the electronic fence.

In this technical solution, the electric water sports device is further provided with an alarm unit, wherein when the electric water sports device has operated to have exceeded the predetermined safety range of the electronic fence, the alarm unit is capable of timely generating an alarm to a user or an external monitoring end such that further processing is made by the user or the monitoring end. For example, when an alarm is generated, the electric water sports device is controlled to return to the safety range of the electronic fence, which improves safety of the electric water sports device during operation.

Optionally, the device body is further provided with a wireless communication module, and the wireless communication module is configured to communicate with an external device in a wireless manner.

In this technical solution, the wireless communication module is capable of implementing the wireless communication function between the electric water sports device and the external device. The wireless communication module may be a fourth generation communication (4G) module. For example, the operation details of the electric water sports device may be sent to the external monitoring end or receive management data and the like sent by the external device.

Optionally, the device body is further provided with an electric panhead and an inertia measurement unit (IMU), the IMU being configured to acquire posture data of the electric panhead and send the posture data to the controller, and the controller is further configured to define a rotation parameter of the electric panhead according to the posture data.

In this technical solution, the rotation parameter includes rotation angular speed and/or rotation angular acceleration.

In this technical solution, the electric panhead is configured to install a photographing device, wherein the photographing device may be a moving video recorder or a camera. By virtue of the IMU, the posture data of the electric panhead may be acquired. According to the posture data, the rotation parameter of the electric panhead may be adjusted, and hence the photographing angle of the photographing device may be reasonably controlled and adjusted. In this way, stability of photographing is ensured, and photographing quality is improved.

Optionally, the controller is further configured to calculate longitude and latitude, and elevation of the electric water sports device according to the posture data and the positioning data, and the controller is further configured to determine the range of the electric fence in the electronic map according to the longitude and latitude, the elevation and the electric power data.

In this technical solution, the longitude, latitude, and elevation information of the electric water sports device calculated by the controller according to the positioning data and the posture data are more accurate. That is, according to the posture data acquired by the IMU, the positioning information of the electric water sports device may be rectified, such that the range of the electronic fence may be more accurately determined.

Optionally, the device body is further provided with a geomagnetic sensor, the geomagnetic sensor being configured to acquire operation direction data of the electric water sports device and send the operation direction data to the controller, the controller is further configured to send the operation direction data to the wireless communication module, and the wireless communication module is configured to send the operation direction data to the external device.

In this technical solution, the geomagnetic sensor is capable of acquiring in real time the operation direction of the electric water sports device, and is capable of sending the operation direction data to the external monitoring end via the wireless communication module. The monitoring end is capable of acquiring the operation details of the electric water sports device according to the operation direction data, thereby implementing safety management of the electric water sports device.

Optionally, a front part of the device body is provided with a straight-going return indicator, a left-turn return indicator and a right-turn return indicator, wherein the controller is further configured to drive the straight-going return indicator, the left-turn return indicator or the right-turn return indicator to guide a return direction according to a return instruction and travel direction information received from the external device.

In this technical solution, three return indicators are arranged at the front part of the device body; wherein during return, the controller drives different return indicators such that the user acquires the return direction, straight-going, left-turn or right-turn, thereby guiding the device to return back. In this way, user experience in water travel is enhanced for the user.

Optionally, two or three left-turn return indicators are used and sequentially arranged on a left side of the front part of the device body, and two or three right-turn return indicators are used and are sequentially arranged on a right side of the front part of the device body.

In this technical solution, two or three turn return indicators are spacedly arranged on two sides of the front part of the device body, wherein the controller drives the turn return indicators at different positions to more accurately notify the user of the turn angle during return, thereby guiding the device to return back.

Optionally, the device body is further provided with a ranging sensor, the ranging sensor being configured to acquire a first distance from the electric water sports device to an obstacle and send the first distance to the controller, and the controller is configured to control the device to avoid the obstacle according to the first distance.

In this technical solution, the electric water sports device is further provided with the ranging sensor; and the controller is capable of judging whether the distance from the electric water sports device and the obstacle is safe according to the distance data acquired by the ranging sensor. In this way, reasonable obstacle avoidance is implemented, and safety of the electric water sports device during operation is improved.

Optionally, the positioning system includes at least one of a GPS positioning system, a Beidou navigation satellite system and a GLONASS satellite positioning system.

In this technical solution, the positioning system of the electric water sports device may be any positioning system capable of implementing the positioning function as long as the system implements real-time positioning of the electric water sports device.

Optionally, the device body is further provided with a display unit, and the controller is further configured to send an operation parameter of the water sports device to the display unit, the display unit being configured to display the operation parameter; wherein the operation parameter includes at least one of the electric power data, the remaining operation duration, the operation direction, information indicating whether the return exceeds the range of the electronic fence, a maximum lateral acceleration of the water sports device and a speed of the water sports device, and the remaining operation duration is a difference between a predetermined operation duration and a duration where the electric water sports device has operated.

In this technical solution, the electric water sports device is further provided with the display unit; wherein the display unit may be a display screen or the like which is capable of displaying related parameters of the operation of the electric water sports device. The user is capable of acquiring the operation details of the electric water sports device according to the parameters, and thus makes a reasonable operation and control selection, which is very visual and convenient.

The present disclosure further provides a monitoring system for a water sports device, including a smart terminal and at least one electric water sports device as described above; wherein the smart terminal is in wireless communication with the electric water sports device, and the smart terminal is configured to remotely manage the electric water sports device.

In this technical solution, one smart terminal may remotely manage a plurality of electric water sports devices, and data is transmitted between the electric water sports devices and the smart terminal in a wireless communication manner. For example, the electric water sports device may automatically send the operation parameter, even the photographed videos or pictures or the like to the smart terminal; and the smart terminal may acquire the operation details of the electric water sports device according to the parameters, and then implement safety management for the electric water sports device according to the operation details.

Optionally, the smart terminal is configured to send a return instruction to the electric water sports device and provides travel direction information, and the electric water sports device returns according to the travel direction information upon receiving the return instruction.

In this technical solution, the monitoring system is capable of sending the return instruction and the travel direction information to the electric water sports device during operation via the smart terminal, such that the user is capable of controlling the electric water sports device to return according to the received travel direction information. In this way, smart return guiding is implemented for the electric water sports device. For example, the operator of the electric water sports device may instruct the electric water sports device may be instructed to return when the electric water sports device exceeds the predetermined operation duration by using the monitoring system.

Optionally, the controller is further configured to send an operation parameter of the electric water sports device to the smart terminal.

Optionally, the smart terminal is further configured to send a predetermined map range and/or a predetermined operation duration to the electric water sports device.

In this technical solution, the smart terminal is capable of send the predetermined data of the map range and/or the predetermined operation duration to the electric water sports device in a wireless communication manner, to complete function setting of the predetermined map range and/or the predetermined operation duration of the electric water sports device. In this way, the range of the electronic fence of the electric water sports device is further managed.

The benefits of the present disclosure lie in that:

With the electric water sports device and the monitoring system, by virtue of the positioning system arranged thereon, the real-time position of the electric water sports device may be acquired, the controller includes the electronic map and is capable of determining the range of the electronic fence in the electronic map according to the electric power data and the positioning data of the electric water sports device, such that the electric water sports device is capable of smartly planning in real time a safe travel range thereof according to the real-time electric power. In this way, a failure to return due to lack of electric power is prevented, and safety of the electric water sports device is improved.

DETAILED DESCRIPTION

Hereinafter the present disclosure is further described with reference to the embodiments. However, the present disclosure is not limited to the scope as defined by the embodiments described.

Embodiment 1

Figure 1:
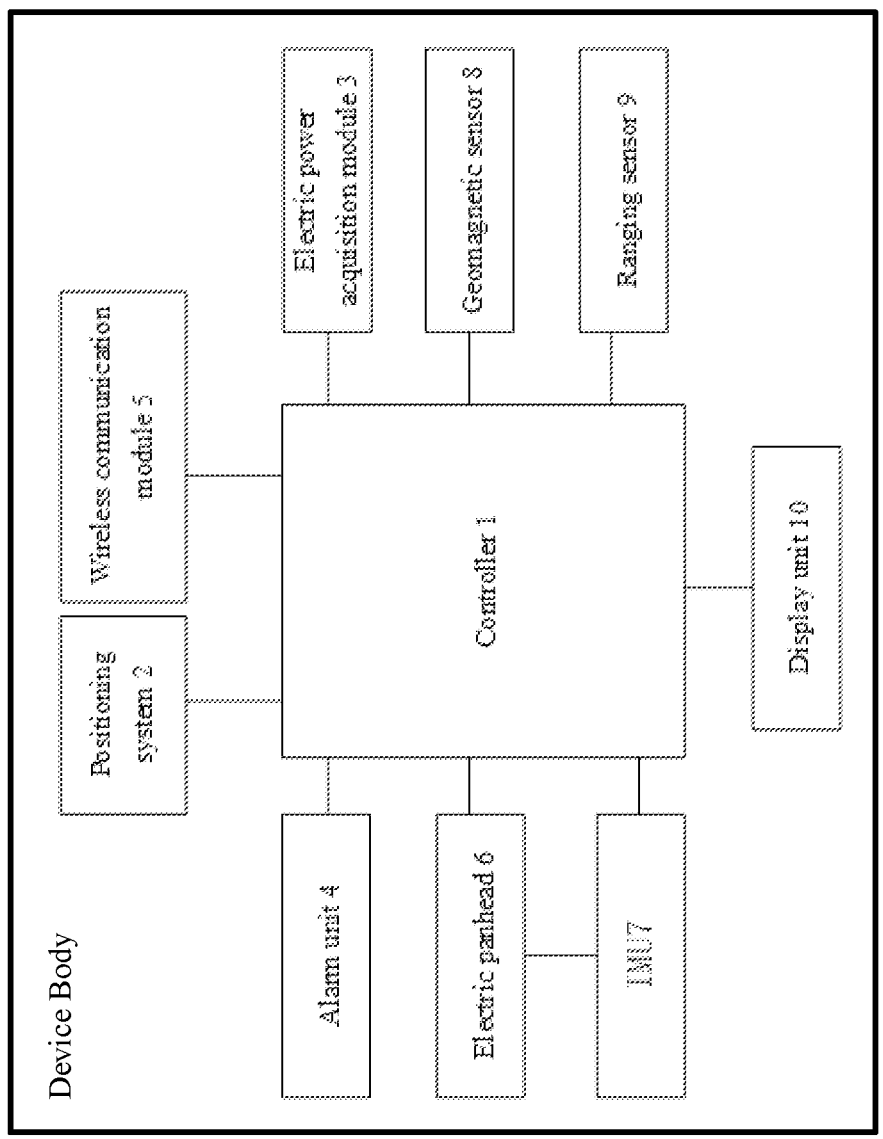
FIG. 1 is a schematic diagram of modules of an electric water sports device according to Embodiment 1 of the present disclosure.

As illustrated in FIG. 1, this embodiment provides an electric water sports device. The device includes a device body (not shown in the drawings); wherein the device body is provided with a positioning system 2, a controller 1, an electric power acquisition module 3, an alarm unit 4, a wireless communication module 5, an electric panhead 6, an IMU 7, a geomagnetic sensor 8, a ranging sensor 9 and a display unit 10. The controller 1 includes an electronic map, wherein the electronic map includes water depth. In this embodiment, the display unit 10 is a display screen, the alarm unit 4 is a loudspeaker, and the wireless communication module 5 is a 4G module. In this embodiment, the electric panhead 6 is configured to install a photographing device, wherein the photographing device may be a moving video recorder or a camera.

In this embodiment, the positioning system 2 is configured to acquire positioning data of the electric water sports device and send the positioning data to the controller 1; and the electric power acquisition module 3 is configured to acquire in real time electric power data of the electric water sports device and send the electric power data to the controller 1.

In this embodiment, the wireless communication module 5 is configured to communicate with an external device. The geomagnetic sensor 8 is configured to acquire operation direction data of the electric water sports device and send the operation direction data to the controller 1; the controller 1 is configured to send the operation direction data to the wireless communication module 5; and the wireless communication module 5 is configured to send the operation direction data to an external remote monitoring end. That is, the geomagnetic sensor 8 is capable of acquiring in real time the operation direction of the electric water sports device, and is capable of sending the operation direction data to the external monitoring end via the wireless communication module 5. The monitoring end is capable of acquiring the operation details of the electric water sports device according to the operation direction data, thereby further implementing safety management of the electric water sports device.

In this embodiment, the IMU 7 is configured to acquire posture data of the electric panhead 6 and send the posture data to the controller 1; and the controller 1 is further configured to define a rotation parameter of the electric panhead 6 according to the posture data, wherein the rotation parameter includes rotation angular speed, rotation angular acceleration and the like. By virtue of the IMU 7, the posture data of the electric panhead 6 may be acquired. The controller 1 adjusts the rotation parameter of the electric panhead 6 according to the posture data, and hence the photographing angle of the photographing device may be reasonably controlled and adjusted. In this way, stability of photographing is ensured, and photographing quality is improved.

In this embodiment, a front part of the device body is provided with a straight-going return indicator, three left-turn return indicators are sequentially arranged on a left side of the front part of the device body, and three right-turn return indicators are sequentially arranged on a right side of the front part of the device body. The controller 1 is further configured to drive the straight-going return indicator or the left-turn return indicator or the right-turn return indicator according to a return instruction and travel direction information received from an external device, to guide the return direction.

In addition, the controller 1 is further configured to calculate longitude and latitude, and elevation of the electric water sports device according to the posture data and the positioning data; and the controller 1 is further configured to determine the range of the electronic fence in the electronic map according to the longitude and latitude, the elevation, the water depth, a remaining operation duration, the electric power data and the predetermined map range, wherein the remaining operation duration is a difference between a predetermined operation duration and a duration where the electric water sports device has operated.

In this embodiment, the controller 1 is further configured to judge whether the electric water sports device exceeds the range of the electronic fence, and drive the alarm unit to generate an alarm if the electric water sports device exceeds the range of the electronic fence. That is, when the electric water sports device exceeds the safety range of the electronic fence, the alarm unit 4 is capable of timely generating an alarm to a user or an external monitoring end such that further processing is made by the user or the monitoring end. For example, by virtue of the alarm, the user is capable of controlling the electric water sports device to return to the safety range of the electronic fence, such that safety of the electric water sports device is improved.

In this embodiment, the ranging sensor 9 is configured to acquire a first distance from the electric water sports device and an obstacle and send the first distance to the controller 1, and the controller 1 is further configured to control the electric water sports device to avoid the obstacle according to the first distance. By virtue of the ranging sensor 9 arranged on the electric water sports device, the controller 1 is capable of judging whether the distance from the electric water sports device and the obstacle is safe according to the distance data acquired by the ranging sensor 9. In this way, reasonable obstacle avoidance is implemented, and safety of the electric water sports device during operation is improved.

In the present disclosure, the positioning system 2 may be any one of a GPS positioning system, a Beidou navigation satellite system and a GLONASS satellite positioning system. In this embodiment, the GPS positioning system is used.

In this embodiment, the controller 1 is further configured to send an operation parameter of the electric water sports device to the display screen, wherein the display screen is configured to display the operation parameter; wherein the operation parameter includes the electric power data, the remaining operation duration, the operation direction of the electric water sports device, information indicating whether the return exceeds the range of the electronic fence, a maximum lateral acceleration of the water sports device and a speed of the water sports device. According to these parameters, the user is capable of acquiring the operation details of the electric water sports device, and hence makes a reasonable operation and control selection.

In this embodiment, the electric water sports device is an electric surfboard. Although only one IMU 7 is described hereinabove, in practice a plurality of IMUs 7 may be used. One of the plurality of IMUs 7 is arranged on the electric panhead 6 and is dedicatedly configured to acquire the posture data of the electric panhead 6, and the controller 1 adjusts or defines the rotation parameter of the electric panhead 6 according to the posture data. The remaining IMUs 7 may be arranged at other positions of the electric surfboard, and the posture data acquired by these IMUs 7 are used for rectifying positioning precision of the positioning system 2, that is, for determining the longitude and latitude, and the elevation information of the electric water sports device.

In this embodiment, by virtue of the positioning system 2 arranged on the device body, the real-time position of the electric water sports device may be acquired; the posture data may be acquired by using the IMU; the controller is capable of calculating the longitude and latitude, and the elevation information of the electric water sports device according to the real-time position and the posture data, that is, the controller is capable of rectifying the positioning information of the electric water sports according to the posture data; the controller 1 includes the electronic map, wherein the electronic map includes the water depth; the controller 1 is capable of determining the range of the electronic fence in the electronic map according to the electric power data, the positioning data, the water depth and the posture data of the electric water sports device, such that the electric water sports device is capable of smartly planning in real time a safe travel range thereof according to the real-time electric power. In this way, a failure to return due to lack of electric power is prevented, and safety of the electric water sports device is improved. Further, by predetermining a safe map range in the electronic map, it may be smartly ensured that the electric water sports device has operated in a safe water region by further reference to the positioning data and the electric power data.

Embodiment 2

Figure 2:
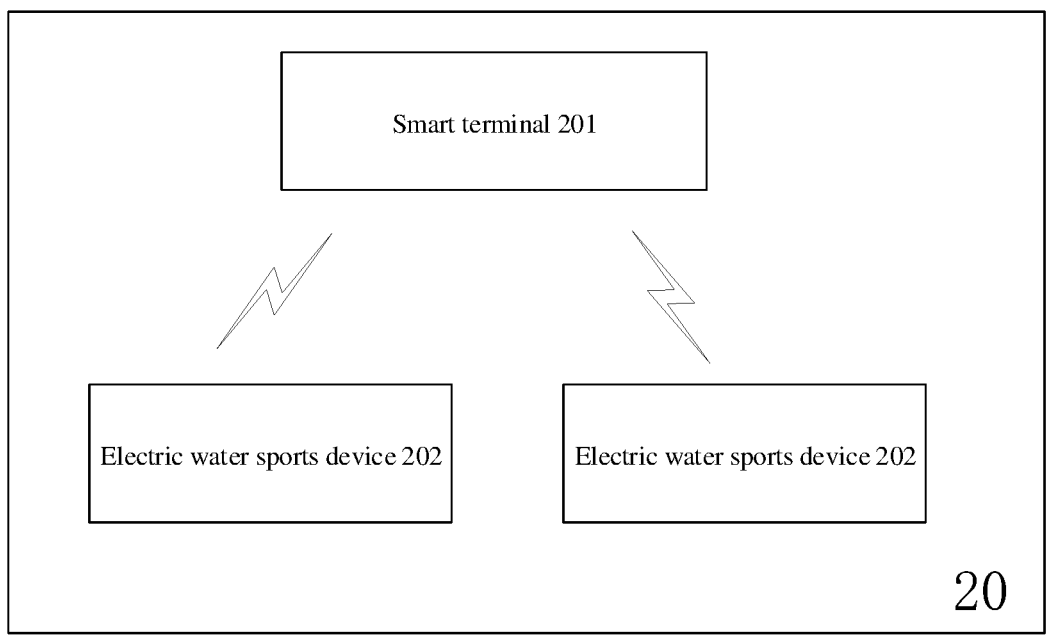
FIG. 2 is a schematic structural diagram of a monitoring system for an electric water sports device according to Embodiment 2 of the present disclosure.
Figure 3:
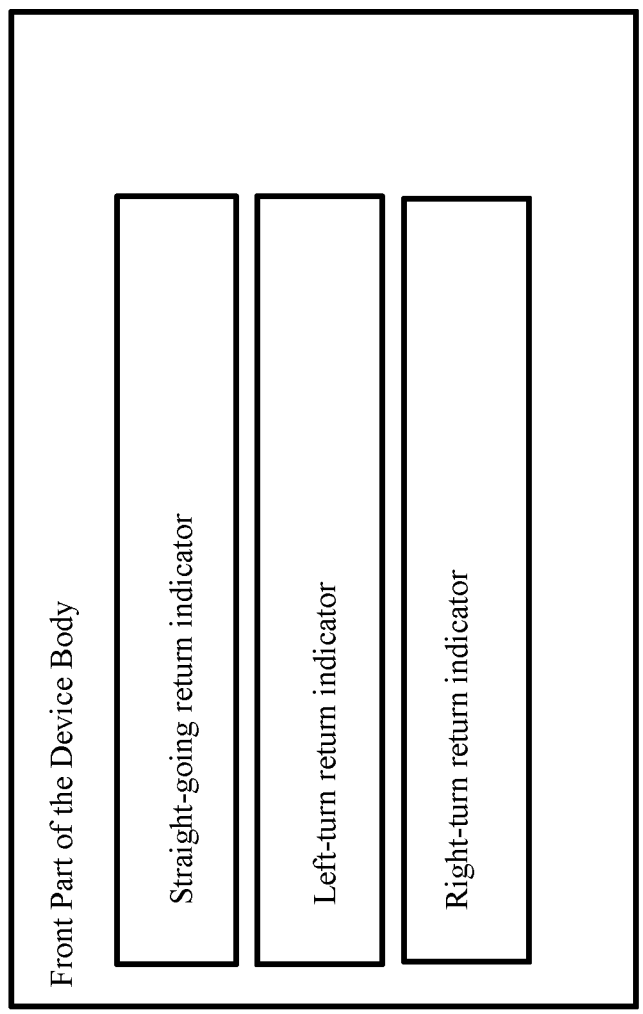
FIG. 3 is a graphical representation showing the location of various indicators on the front part of the device body.
Figure 4:
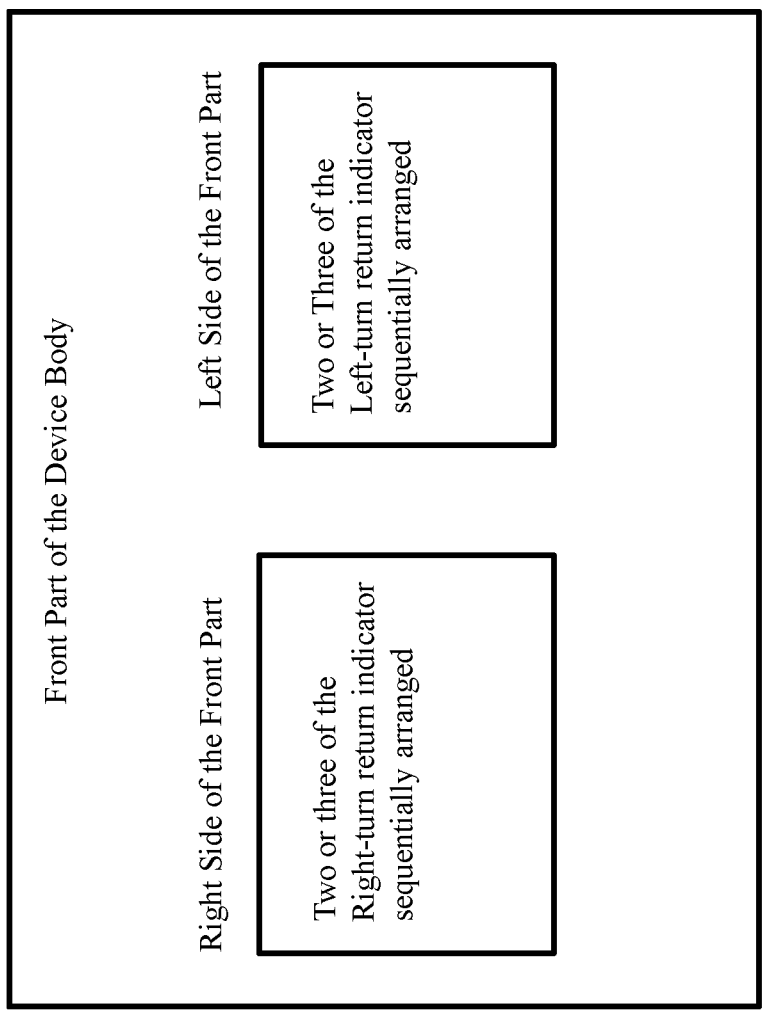
FIG. 4 is a graphical representation showing the location of various indicators on the left and right side of the front part of the device body.

As illustrated in FIG. 2, the present disclosure further provides a monitoring system 20 for an electric water sports device, including a smart terminal 201 and two electric water sports devices 202 as described in Embodiment 1; wherein the smart terminal 201 is in wireless communication with the electric water sports device 202, and the smart terminal 201 is configured to remotely manage the electric water sports device 202. Specifically, the smart terminal 201 is configured to send a predetermined map range and a predetermined operation duration to the electric water sports device 202, the smart terminal 201 is further configured to send a return instruction to the electric water sports device 202, and the electric water sports device 202 returns back according to the travel direction information upon receiving the return instruction. The controller is further configured to send an operation parameter of the electric water sports device 202 to the smart terminal 201.

In this embodiment, one smart terminal 201 is capable of managing a plurality of electric water sports devices 202, the smart terminal 201 is capable of sending data of the predetermined map range and the predetermined operation duration to the electric water sports device 202 in a wireless communication manner, such that function setting of the predetermined map range and/or the predetermined operation duration of the electric water sports device 202 is completed. In this way, the range of the electronic fence of the electric water sports device 202 is further managed.

In this embodiment, the monitoring system is capable of sending the return instruction and the travel direction information to the electric water sports device 202 during operation via the smart terminal 201, such that the user is capable of controlling the electric water sports device 202 to return according to the received travel direction information. In this way, smart return guiding is implemented for the electric water sports device 202. For example, the operator of the electric water sports device 202 may instruct the electric water sports device may be instructed to return when the electric water sports device 202 exceeds the predetermined operation duration by using the monitoring system 20.

In this embodiment, the electric water sports device 202 may further periodically send the operation parameter, and photographed videos or pictures photographed by a photographing device arranged on the electric panhead to the smart terminal 201; and the smart terminal 201 is capable of acquiring the operation details of the electric water sports device 202 according to these parameters, and then implementing safety management for the electric water sports device 202 according to the operation details.

Although the specific embodiments of the present disclosure are described hereinabove, these embodiments are merely illustrated as examples, and the protection scope of the present disclosure is defined by the appended claims. A person skilled in the art may make various variations or modifications to these embodiments without departing from the principle and essence of the present disclosure. However, such variations or modifications shall all fall within the protection scope of the present disclosure.

What is claimed is:

1. An electric water sports device, comprising a device body; wherein the device body is provided with a positioning system, and a controller, wherein the controller comprises an electronic map, the positioning system is configured to acquire a positioning data of the electric water sports device and send the positioning data to the controller, and the controller is configured to determine the range of an electric fence in the electronic map according to the positioning data and an electric power data of the electric water sports device; and
wherein the controller is further configured to determine the range of the electric fence in the electronic map according to the positioning data, the electric power data and a remaining operation duration, the remaining operation duration being a difference between a predetermined operation duration and a duration where the electric water sports device has operated.

2. The electric water sports device according to claim 1, wherein the electronic map comprises water depth, and the controller is further configured to determine the range of the electric fence in the electronic map according to the positioning data, the water depth and the electric power data.

3. The electric water sports device according to claim 1, wherein the controller is further configured to determine the range of the electric fence in the electronic map according to the positioning data, the electric power data and a predetermined map range.

4. The electric water sports device according to claim 1, wherein the device body is further provided with an alarm unit, and the controller is further configured to judge whether the electric water sports device exceeds the range of the electronic fence, and drive the alarm unit to generate an alarm if the electric water sports device exceeds the range of the electronic fence.

5. The electric water sports device according to claim 1, wherein the device body is further provided with a wireless communication module, and the wireless communication module is configured to communicate with an external device in a wireless manner.

6. The electric water sports device according to claim 5, wherein the device body is further provided with a geomagnetic sensor, the geomagnetic sensor being configured to acquire operation direction data of the electric water sports device and send the operation direction data to the controller, the controller is further configured to send the operation direction data to the wireless communication module, and the wireless communication module is configured to send the operation direction data to the external device.

7. The electric water sports device according to claim 6, wherein a front part of the device body is provided with a straight-going return indicator, a left-turn return indicator and a right-turn return indicator, and the controller is further configured to drive the straight-going return indicator, the left-turn return indicator or the right-turn return indicator to guide a return direction according to a return instruction and travel direction information received from the external device.

8. The electric water sports device according to claim 7, wherein two or three left-turn return indicators are used and sequentially arranged on a left side of the front part of the device body, and two or three right-turn return indicators are used and are sequentially arranged on a right side of the front part of the device body.

9. The electric water sports device according to claim 1, wherein the device body is further provided with an electric panhead and an inertia measurement unit (IMU), the inertia measurement unit being configured to acquire a posture data of the electric panhead and send the posture data to the controller, and the controller is further configured to define a rotation parameter of the electric panhead according to the posture data.

10. The electric water sports device according to claim 1, wherein the device body is further provided with a ranging sensor, the ranging sensor being configured to acquire a first distance from the electric water sports device to an obstacle and send the first distance to the controller, and the controller is configured to control the device to avoid the obstacle according to the first distance.

11. The electric water sports device according to claim 1, wherein the positioning system comprises at least one of a GPS positioning system, a Beidou navigation satellite system and a GLONASS satellite positioning system.

12. The electric water sports device according to claim 1, wherein the device body is further provided with a display unit, and the controller is further configured to send an operation parameter of the water sports device to the display unit, the display unit being configured to display the operation parameter; wherein the operation parameter comprises at least one of the electric power data, the remaining operation duration, the operation direction, information indicating whether the return exceeds the range of the electronic fence, a maximum lateral acceleration of the water sports device and a speed of the water sports device.

13. A monitoring system for a water sports device, comprising a smart terminal and at least one electric water sports device as defined in claim 1; wherein the smart terminal is in wireless communication with the electric water sports device, and the smart terminal is configured to remotely manage the electric water sports device.

14. The monitoring system for a water sports device according to claim 13, wherein the smart terminal is configured to send a return instruction to the electric water sports device and provides travel direction information, and the electric water sports device returns according to the travel direction information upon receiving the return instruction.

15. The monitoring system for a water sports device according to claim 13, wherein the controller is further configured to send an operation parameter of the electric water sports device to the smart terminal.

16. The monitoring system for a water sports device according to claim 13, wherein the smart terminal is further configured to send a predetermined map range and/or the predetermined operation duration to the electric water sports device.

* * * * *